FIG. 1

INVENTOR.
WINSTON F. WILLIAMS
BY
AGENT

| POS | 1 | 2 | 3 | 4 | 5 | 6 | DIGIT WHEEL |
|---|---|---|---|---|---|---|---|
| 1 | X | X | | | | | 0 |
| 2 | X | | X | | | | 1 |
| 3 | X | | | X | | | 2 |
| 4 | X | | | | X | | 3 |
| 5 | X | | | | | X | 4 |
| 6 | | X | X | | | | 5 |
| 7 | | X | | X | | | 6 |
| 8 | | X | | | X | | 7 |
| 9 | | X | | | | X | 8 |
| 10 | | | X | X | | | 9 |
| →11 | | | X | | X | | B← |
| 12 | | | X | | | X | B |

X = GROUND

FIG. 7

INVENTOR.
WINSTON F. WILLIAMS
BY  Richard W Anderson
AGENT

FIG. 6

United States Patent Office 3,555,393
Patented Jan. 12, 1971

3,555,393
REMOTE TUNING SYSTEM FOR PLURALITY OF CONTROLLED UNITS EMPLOYING COMMON TUNING CONTROL AND INDICATOR
Winston F. Williams, Cedar Rapids, Iowa, assignor to Collins Radio Company, Cedar Rapids, Iowa, a corporation of Iowa
Filed Apr. 9, 1969, Ser. No. 814,766
Int. Cl. G05b 11/14
U.S. Cl. 318—673                                6 Claims

ABSTRACT OF THE DISCLOSURE

A single control unit, common indicator, and function selector switch is employed to effect the selective tuning of a number of different multi-channel or multi-function radio equipments. The selector switch indicates which of the several equipments is being tuned and monitored. The tuning control unit common to all the electronic services effects tuning of the selected service by enabling logic circuitry to effect an operable arrangement between the tuning control unit, the common indicator, and the selected equipment to be tuned.

---

This invention relates generally to remote tuning control and more particularly to a system to remotely tune a plurality of controlled or tuned units by means of a common tuning control and indicator.

Although not limited to a particular application, the present invention finds special usage and will herein be described as it might be employed in a tuning system for a plurality of airborne equipments where cockpit instrument panel space allocations are at a premium and the aircraft may carry a number of electronic services each of which is tunable to a plurality of different frequencies or channels as the case may be.

Cockpits of modern-day aircraft are overly cluttered with counters, tuning control and function switches to effect the tuning of various navigation, communication, identification and other types of electronic services on board. The space allocation problem is serious enough and an element of confusion can arise from an inordinate number of indicators and control knobs.

In accordance with the present invention, a single control unit, indicator, and function selector switch is employed to effect the selective tuning of a number of different multi-channel or multi-function radio equipments. Thus, for five or more different electronic services which might be carried on board, the present invention provides a means for monitoring the tuned condition in terms of frenquency or channel for each system in a selective manner on a single indicator common to all services. A selector switch operated by the pilot indicates which of the several equipments is being tuned and monitored. A tuning activating or control means common to all the electronic services effects tuning of the selected service by enabling logic circuitry to effect an operable arrangement between the tuning activator, the indicator, and the selected equipment to be tuned.

The system incorporates a step-like tuning approach wherein the common tuning control, in conjunction with the function selector, enables a particular section of a remote switching unit to generate tuning code information into the selected electronic service and to the common indicator. The tuning control means embodied in the system comprises a plurality of rocker switches, each one of which is effective in positioning associated ones of a plurality of digit wheels in the common indicator. For example, three such switches might be used—one which controls the units digit, one the tenths digit, and one the hundreds digit. The particular display is tailored to that which is needed for the particular electronic service which is being tuned. Thus, in one instance, two digit wheels may be employed to indicate the channel numbers from one through twenty. In another instance, three digit wheels might be employed to indicate the frequency to which a service is tuned in tens, units and tenths of megacycles.

In accordance with the present invention, the common indicator is provided with an appropriate number of indicia, the maximum number of which is defined by particular electronic services to be tuned. Means may further be incorporated to mask out or present as blank indications those digits which are not used when a particular function is selected which requires less than all of the available digits in the display.

These and other features of the present invention will become apparent upon reading the following description in conjunction with the accompanying drawings in which.

Figure 1:
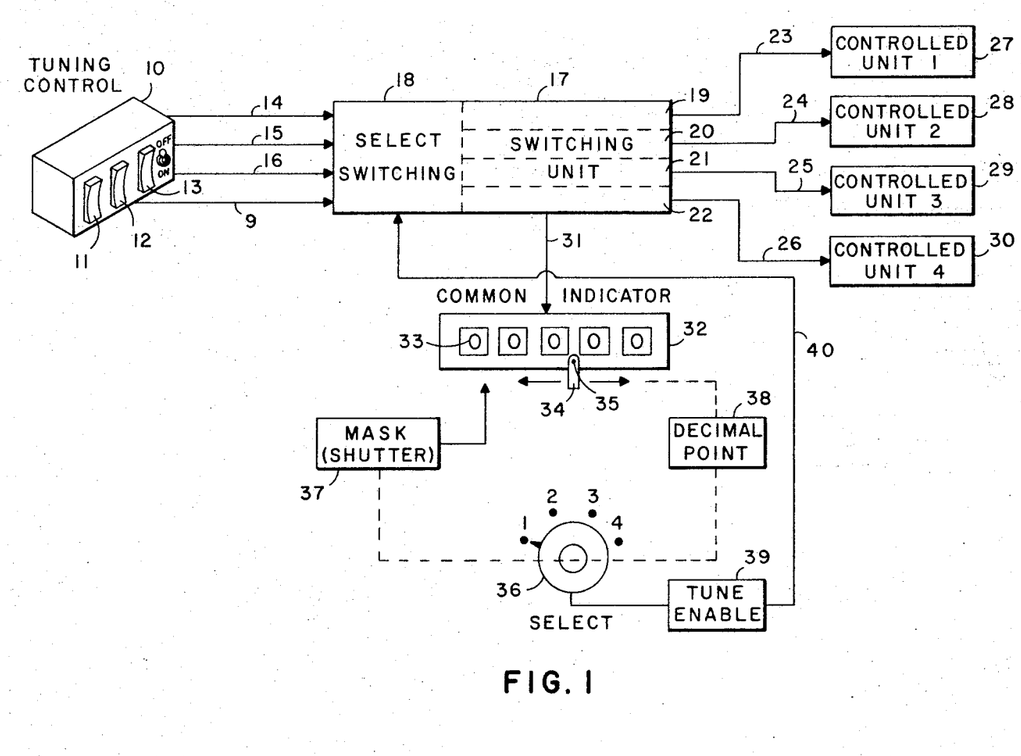
FIG. 1 is a basic functional block diagram of the tuning system in accordance with the present invention.

With reference to FIG 1, the tuning system of this invention is illustrated in basic functional aspects as comprising a remote control system for a plurality of controlled units or devices identified respectively by reference numerals 27, 28, 29 and 30. A common indicating means 32 is employed and shown to be interconnected by means of function line 31 to a switching unit 17. A common tuning control unit 10 includes rocker tuning switches 11, 12 and 13 which are inter-connected with the switching unit 17 by means of lines 14, 15, 16 and 9. The switching unit 17 includes a select switching portion 18 under the control of an input or enabling line 40 from a function selector switch 36, the latter providing a means for effecting an operable interconnection between the tuning control 10, a particular section of the switching unit 17, and the selected one of the controlled units 27–30.

FIG. 1 illustrates the tuning control 10 as being comprised of three rocker switches, the functional details of which will be further considered. Briefly, each of the rocker switches 11, 12 and 13 is a three-position switch, the control functions of which are respectively forward off and reverse. The operational significance of these switches is that a given rocker switch may be depressed in the forward position to cause the selected one of the controlled units to tune in a step-like fashion in a first direction at a predetermined step rate as long as the switch is depressed. In a given application, rocker switch 13 might initiate a forward tuning sequency of appropriate circuitry to control the selected controlled unit in one-megacycle step. The change in tune condition might be indicated on the right-most digit of the common indicator 32. Rocker switch 12 might initiate a selected forward or reverse step tune sequence in the selected control unit in terms of 10-megacycle steps that might be indicated on the next adjacent digit wheel in the common indicator 32. In a similar fashion, the rocker switch 11 might initiate 100-megacycle steps in a selected one of the controlled units and the 100-megacycle steps indicated in the next adjacent indicator of the digit wheel. In this example, the left-most pair of digits on the common indicator 32 would be unused and FIG. 1 illustrates in a functional manner that the selector switch 36, through its cooperation with a mask or shutter function 37, could mask out the unnused ones of the digit wheels in the common indicator.

FIG. 1 further illustrates the selective inclusion and placement of a decimal point in the indicator display by functional cooperation between the selector switch and a decimal point placement function 38. For example, the selectively positioned decimal point carrying member 34 in FIG. 1 might indicate that the readout was in terms of megacycles, tenths of megacycles and hundredths of megacycles.

As will be further discussed, a more preferred arrangement as to the masking out of unused digit wheels in the display may be accomplished by employing wheels positionable to more than ten positions—for example, twelve positions through appropriate Geneva positioning mechanisms, such that when a control unit is selected for which certain ones of the digit wheels of the indicator would not be used, those wheels would be automatically driven to display a blank indication.

FIG. 1 additionally illustrates a functional relationship between the selector switch 36 and a tune enable function 39 by way of line 40 to the select switching portion 18 of the switching unit 17. As will be further discussed, this function establishes an operable relationship between the tuning control unit rocker switches and associated portions 19, 20, 21 or 22 of the switching circuitry associated with each of the controlled units 27–30.

Figure 2:
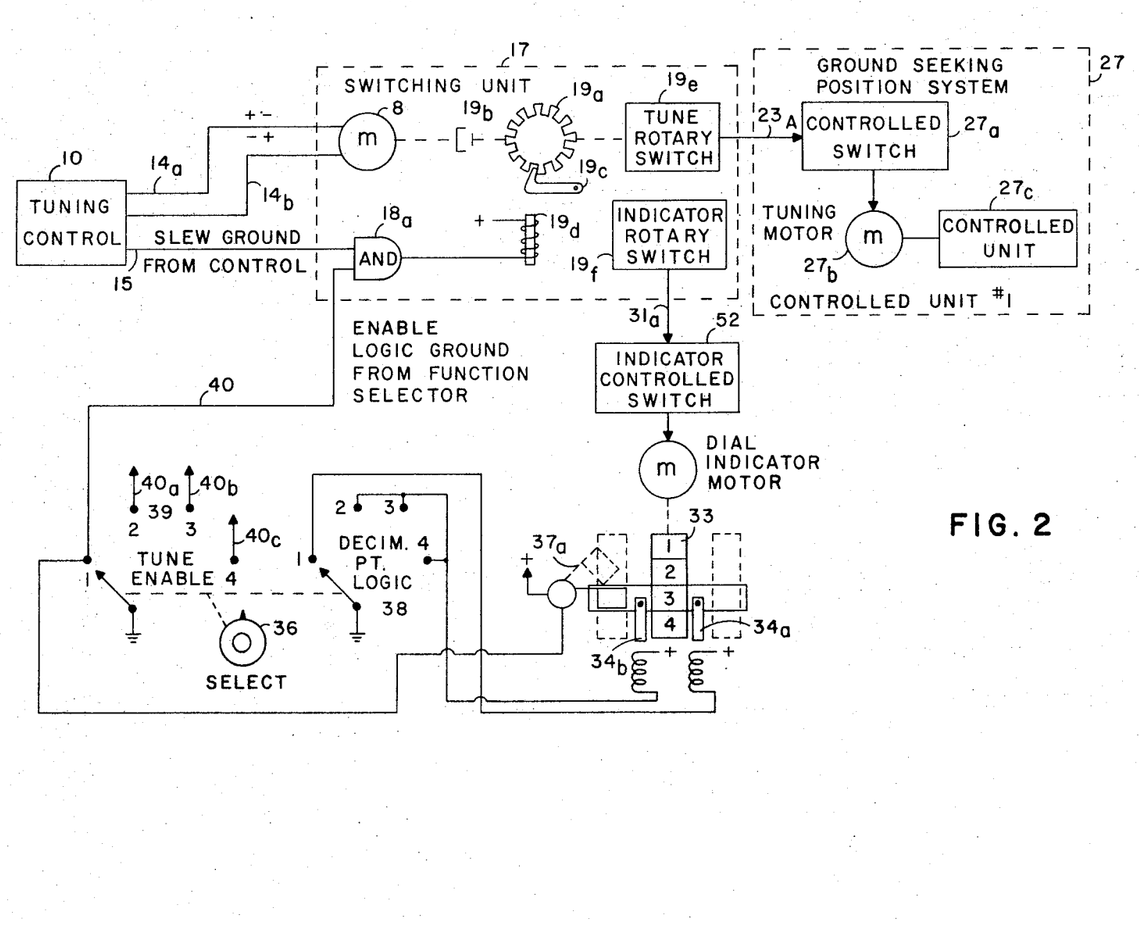
FIG. 2 is a functional schematic diagram of a basic portion of a tuning control system embodiment as it would apply to a given selected controlled unit.

The functional relationship between the tuning control 10, the switching unit 17, the common indicator 32, and one of the control units 27, as selected by function selector 36, is depicted functionally in FIG. 2. Touch-tuning is a known expedient in the art. Touch-tuning incorporates rocker switches, each of which gives the operator individual control in forward, off, and reverse fashion over displayed digits, the composite of which indicates the frequency or channel to which the unit being controlled is tuned. Tuning is effected in a step-like fashion, at a fixed step rate as long as a rocker switch in the tuning control is depressed. The switching unit in basic function presents a step tuning code to the selected one of the controlled units. The step action continues as long as the associated tuning control rocker switch is depressed. The direction of the steps, either ascending or descending, is in turn controlled by the operator.

FIG. 2 illustrates the switching unit as including a motor 8 which drives a notched stop wheel 19a through a slip clutch 19b. A tuning code is obtained by positioning a control switch 19e to successive step positions. This action might be effected by an Autopositioner shaft positioning system of which the notched stop wheel 19a is a portion. Cooperating with the stop wheel is stop pawl 19c, the postion of which is controlled by a solenoid 19d. With this arrangement, assuming the motor 8 is energized and the pawl 19c is withdrawn from a detented relationship with the stop wheel 19a, the stop wheel rotates to turn the control switch sequentially in step-like fashion as long as the motor is energized. The energization of the motor in turn is effected in the tuning control unit 10. As will be further discussed, the tuning control 10 additionally provides a slew ground control 15 which, when enabled for the particular control unit through the position of the function selector switch 36, provides a ground for the locking pawl solenoid 19d to withdraw the pawl 19c from the stop wheel and permit a rotation of the stop wheel 19a and thus the control switch 19c.

FIG. 2 illustrates the motor energization on line-pair 14a–14b as being bidirectional. As aforementioned, bidirectional motor control is effected by a rocker switch in tuning control 10 being depressed in one position or the other, while a deenergization or "off" control is provided when the rocker switch is in the normal center position. Thus, the position of the control switch 19e in the switching unit 17 at any instant defines or sets up a switch code for the associated controlled unit 27. Actually, the control switch 19e is interconnected controlwise with a complementary rotary switch 27a in the controlled unit in accordance with Autopositioner shaft positioning principles, details of which will be further described and referenced. The position of the controlled switch 27a in controlled unit 27 is essentially slaved to that of the control switch 19e in the switching unit 17; that is, any dissymmetry between the relative shaft positions of the two switch rotors causes a motor 27b in the controlled unit 27 to tune unit 27 until controlled unitt switch 27a is in position correspondence with the control switch 19e in the switching unit.

Figure 5:
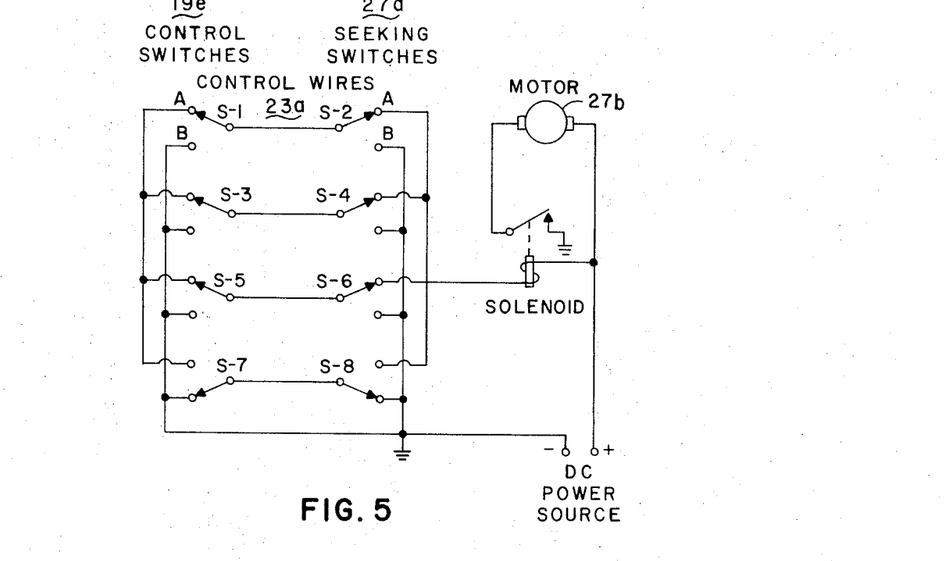
FIG. 5 is a simplified control system diagram illustrating the open-seeking positioning system employed.

The control switch 19e in switching unit 17, the interconnection 23a, the controlled switch 27a, and the motor 27b in the controlled unit 27 might thus comprise an Autopositioner shaft positioning system as defined in Pat. No. 2,476,673 to May et al., assigned to the assignee of the present invention. The manner in which the controlled switch 27a in the controlled unit is slaved position-wise to the control switch 19e in the switching unit might be be comprehended by reference to the simplified control diagram of FIG. 5. The system is most readily explained by considering a system composed of single-pole, double-throw switches, as shown in FIG. 5. When the switches are set symmetrically as indicated, there is no current path from the solenoid coil to ground and the solenoid and motor reunenergized. If, however, any one of the control switches is set to a position opposite to that of the corresponding seeking (controlled) switch, a path to ground will be closed energizing the solenoid and motor until the seeking switches are repositioned to positions symmetrical to the control switches, which will again open the solenoid circuit. The total number of different combinations of switch positions in such a system is $2^n$ where $n$ is the number of control wires used. In the four-wire system shown, $2^n$ or sixteen different combinations exist. One position is unusable, since if all of the seeking switches are set to the "B" position, there can be no path from the solenoid to ground no matter how the control switches are set and the system is dead. Hence, the maximum number of usable combinations in such a system is $2^{n-1}$. Thus, a three-wire system can control seven positions, four wires can control fifteen positions, five wires can control thirty-one positions, etc. In an actual working system, leaf type single-pole, double-throw switches could be used and actuated by cams. To eliminate the bulk and complexity of such an arrangement, rotary wafer-type switches are preferable.

The motor 27b in the controlled unit 27 is connected to the controlled device; that is, the device to be tuned. In the embodiment pictured in FIG. 2, the device might be a variable capacitor and the motor connected to rotate the shaft.

The functions previously described with respect to selective decimal point display and position in the indicator display, and masking or blanking out of unused digit wheels for a particular selected controlled unit presentation, are shown in FIG. 2 as being effected by two switches positioned by the function selector 36. A first switch 39, in position 1, selects controlled unit 27 for tuning by an interconnection 40 with an AND gate 18a in switching unit 17. Switch 39 provides a ground on line 40. Slew line 15 is grounded through actuation of an associated rocker switch in tuning unit 10 to energize solenoid 19d and withdraw the pawl 19c, thus allowing the wheel 19a to rotate to effect tuning. If we assume that controlled unit 1 utilizes only two of three digit wheels in a common indicator as depicted in FIG. 2, the switch 39 might further provide a ground to energize an associated flag 37a so as to obscure the left-hand digit wheel presentation. Although only one portion of the system is depicted in FIG. 2, the figure illustrates that the selection of controlled unit 2 disables the control action as concerns unit 1 by removing the ground from line 40 which deenergizes solenoid 19d whereby pawl 19c locks wheel 19a and further motor operation is taken up in slip clutch 19b.

A switch 38 positioned by the function selector 36 may effect decimal point logic by providing a ground to further solenoid members which would cause decimal point carrying members to be positioned into viewing range or conversely withdrawn from the observer's view. A complete system might use one or more decimal point carrying numbers, such as 34a and 34b, to display the various tuned conditions of the multiple controlled units. It is to be further realized that the masking of unused digit wheels in the common indicator might be accomplished by providing a ground connection from switch 39 to an appropriate interconnect with the indicator controlled switch 52 so as to cause the digit wheel or wheels carrying unused digits to be positioned to a blank space.

Figure 3:
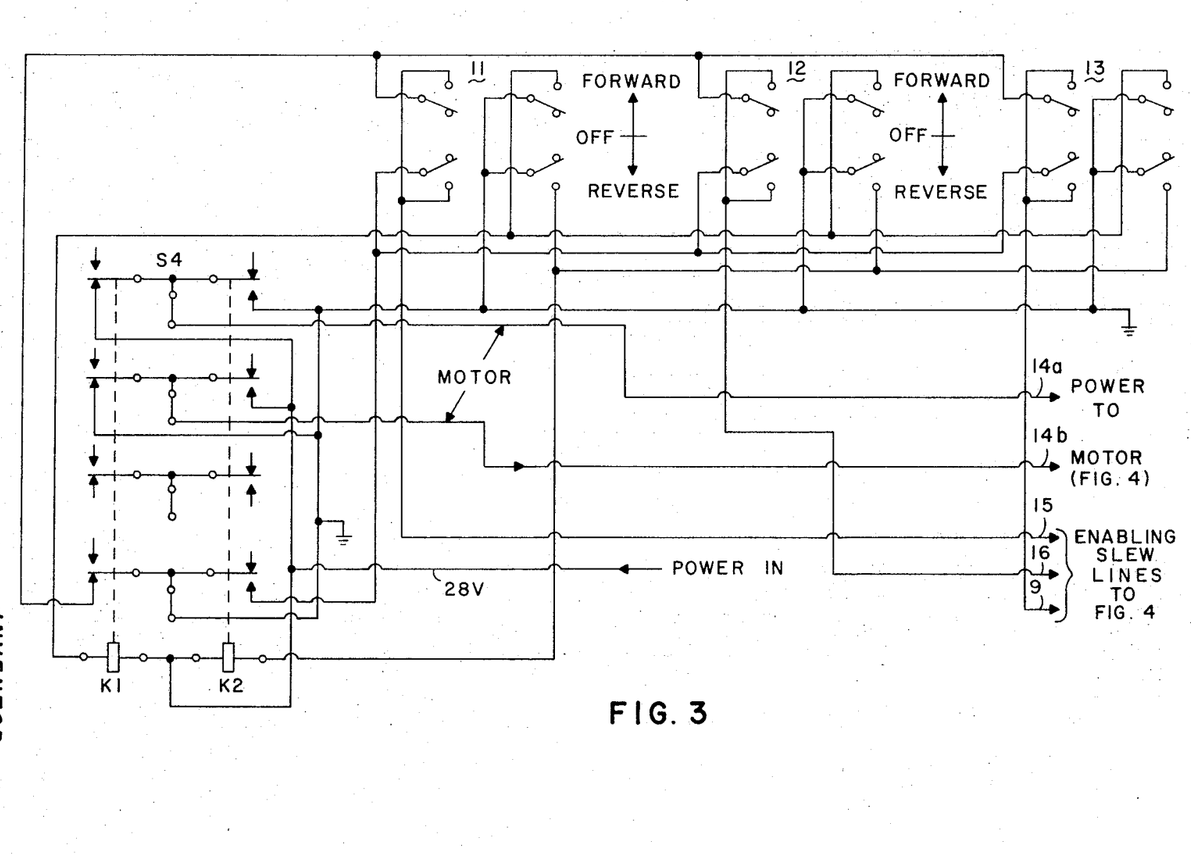
FIG. 3 is a schematic diagram of a touch-tune motor control system as employed in the present invention.
Figure 4:
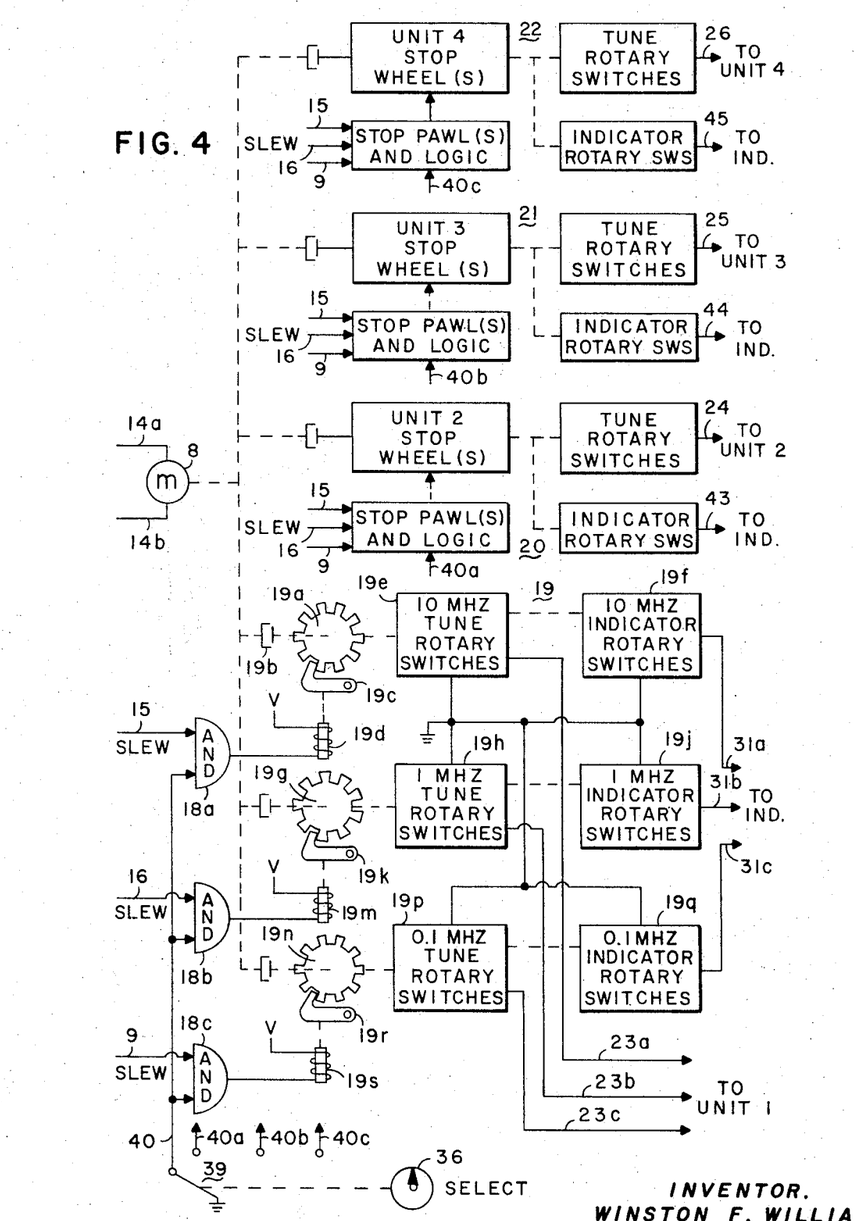
FIG. 4 is a functional schematic diagram of a tuning code switching system for four controlled units and including details of the tuning control and logic switching apparatus.

A more detailed showing of the operation of the tuning control unit 10 and its interconnections with a more complete system is indicated in FIGS. 3 and 4. Considering first the tuning control unit 10 (FIG. 3), the unit comprises a plurality of three-position rocker switches 11, 12 and 13. These three switches along with appropriate interconnections with two multi-contact relays K1 and K2 serve to control the application of power in a bidirectional or reverse polarity sense to the motor 8 in the logic switching unit 17. In addition a motor slew ground line is associated with each rocker switch.

As previously discussed, rocker switches 11, 12 and 13 remotely control the code switches in switching unit 17. One set of poles of each switch (the right-hand set of switches 11, 12 or 13) causes relay K1 or K2 to hold switch S4 in one of its two states whereupon switch S4 will supply a ground through one of the other poles of a depressed rocker switch to a slew line associated with that particular rocker switch. The slew lines are identified as lines 15, 16 and 9. Switch S4, controlled by rocker switches 11, 12 or 13, also governs the polarity of a power source supplied to the motor 8 in the switching unit 17. Therefore, if the upper position of switch 11, switch 12, or switch 13 is depressed, relay K1 is energized. The motor then rotates in one direction. If the lower portion of switches 11, 12 or 13 is depressed, relay K2 is energized and switch S4 causes the motor to rotate in the other direction. This feature allows the selected controlled unit and the indicator to increase in frequency or channel indication as the case may be if the upper portion of one of the rocker switch actuators is depressed, and to decrease in frequency or channel if the lower portion of one of the actuators is depressed. Further details concerning this type of rocker switch motor control is defined and claimed in Pat. No. 3,064,172 to R. L. Young et al., assigned to the assignee of the present invention. Details of a rocker switch assembly of a type which might be utilized in the present invention is described in detail in Pat. No. 3,098,902 to R. J. Meyer, assigned to the assignee of the present invention.

FIG. 4 illustrates the tuning control switching arrangement in conjunction with four switching means 19, 20, 21 and 22. Since three double-pole rocker switches 11, 12 and 13 are embodied in the tuning control unit 10, a maximum of three-control switches for each controlled unit may be incorporated into the system. Should any one of the switching means 19, 20, 21 or 22 require more than three-control switches to effect tuning, the tuning control 10 would incorporate a like number of rocker switches.

The significance of the slew lines 15, 16 and 19 is to operate the locking pawl or pawls associated with the detent wheel or wheels of the selected one of the control units. Thus, FIG. 4 illustrates three detent wheels each with an associated pawl for a chosen controlled unit 1 as selected by the function selector. The tune enable logic is illustrated again in FIG. 4 as being provided by a ground input through a common line 40 from switch 39 to an AND gating arrangement (gates 18a, b, c) second inputs to which are respectively the slew lines 15, 16 and 9 from the three rocker switch assemblies illustrated in FIG. 3.

It is noted that a single motor 8 is all that is necessary for the plurality of tuning code switches in the system. This is possible by incorporation of slip clutches such as 19b between the motor drive and each individual detent wheel in the switching unit. It is to be realized that any detent wheel in engagement with a pawl (the pawl being unenergized) is not positionable and the drive from the motor 8 slips the associated clutch between the motor drive and the detent wheel. Each of the detent wheels, 19a, 19g and 19n, in the switching unit 17 whch is effective in tuning control unit 1, drives an associated rotary switching means 19e, 19h, or 19p. Each of the wheels may additionally drive an associated indicator control switch 19f, 19j, or 19q. Output lines 23a, 23b, and 23c from the tune rotary switches are applied to control unit 1 controlled switches to initiate a follow-up action for correspondence between the controlled switch in the controlled unit and the control switch in the switching unit 19.

Although not illustrated in detail in FIG. 4, it is to be understood that tuning switches 20, 21 and 22 would likewise be positionable by the mechanical drive from the common motor 8 through slip clutches to detented stop wheels, each unit comprising a given number of stop wheels in accordance with the number of control switches needed to effect tuning of the unit. The function selector switch 36, in positions 2, 3 or 4, provides an enabling ground to an AND gate through respective lines 40a, 40b, or 40c. Second inputs to these gating functions would be the slew lines 15, 16 and 9 from the rocker switches in the tuning control 10.

Figure 6:
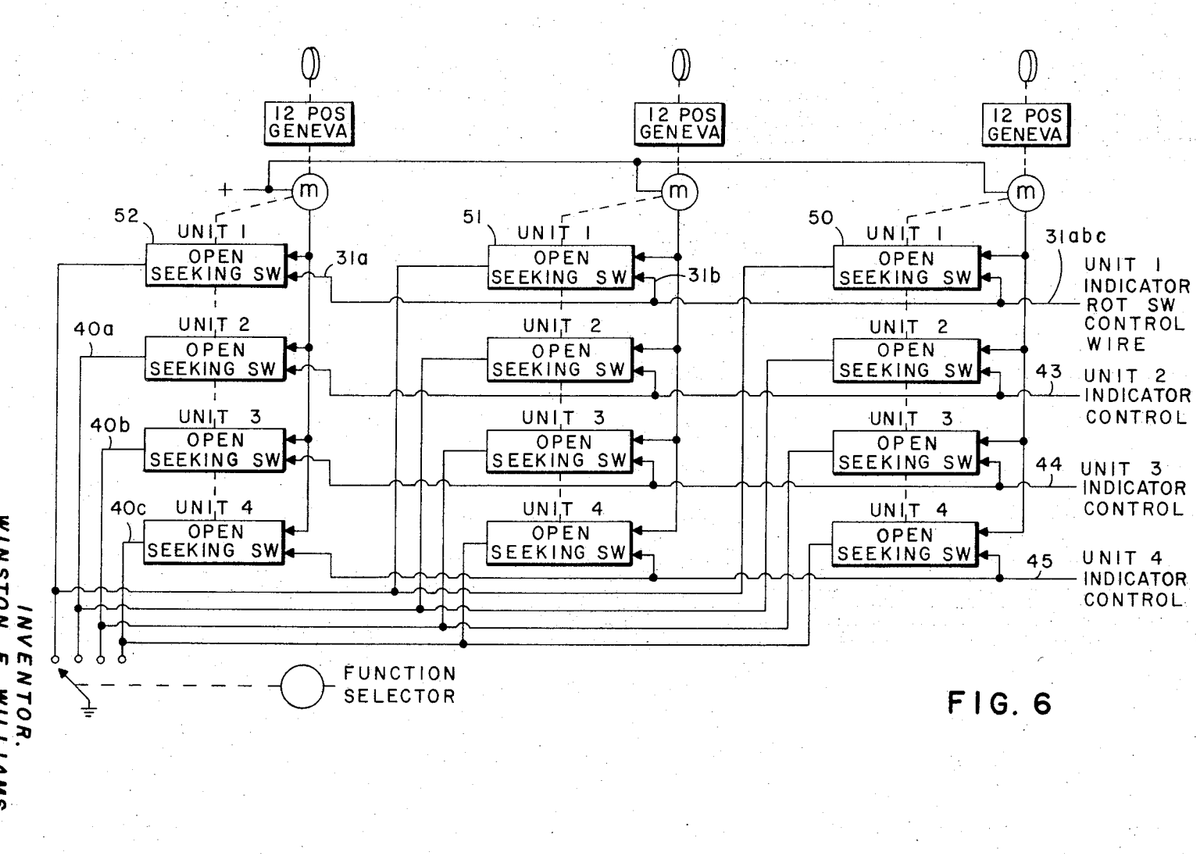
FIG. 6 is a functional schematic of the common indicator positioning and logic.

FIG. 6 illustrates functionally the manner in which the digit wheels comprising the indicator may be employed as a single indicator for a plurality of tuned functions. Previous discussions in regard to FIG. 4 indicated that the positioning system within the switching unit, in response to energization of the motor by the common tuning control, positioned a plurality of rotary switches which formed the control portion of a remote positioning system such as an Auto-positioner system.

A first plurality of rotary switches were described as being effective to provide a tuning code for the tuning of the selected one of the controlled devices. Each of the stop wheel positioning arrangements in FIG. 4 was further described as positioning an associated indicator control rotary switch. The indicator rotary switch control scheme need not be identical to the associated tuning switch scheme even though, with regard to a particular tuned device, the tuning and indicating code rotary switches are simultaneously positioned. Thus, a system might employ an indicating arrangement operating on a different tuning code than the associated tuned devices. For example, the indicator might be adapted to be responsive to a 2-out-of-6 tuning code, while each of the tuned devices might be designed to be responsive to its own peculiar tuning code such as binary coded decimal, pure binary, or the described Autopositioner tuning sys- tef utilizing the wire-saving control scheme wherein $2^n-1$ tuning positions are possible wtih the use of $n$ interconnecting wires between the control rotary switches and the controlled rotary switches.

Thus, FIG. 6, and further discussion relating to the indicator, relates to a system operating on a 2-out-of-6 tuning code wherein the system is responsive to grounded pairs of wires. With reference to FIG. 6, the common tuning system will first be discussed with respect to its inherent built-in "memory" wherein the common set of digit display wheels are connected in the system so as to indicate the instantaneous tuning condition of the selected one of the tuned devices, and upon the operator selecting a subsequent tuned device, the indicator system will immediately reposition itself to the existing tuned condition of the newly selected tuned device.

With a 2-out-of-6 grounded pair tuning code scheme in mind, and considering that we may wish the system to display a blank digit indication in response to certain tune devices being selected, a 12-position Geneva system is indicated in FIG. 6 as driving each indicator digit wheel. Each of the Geneva positioning systems is driven by an associated motor, there being three such motors for the three digit wheels shown in FIG. 6. Each of the motors is in turn driven in response to an open-seeking switch arrangement, thus each motor is controlled in a manner analogous to the Autopositioner control system of FIG. 5. In this instance, the control switches of FIG. 5 become the indicator rotary switches of FIG. 4 and the seeking switches of FIG. 5 are the bank of open-seeking controlled switches indicated in FIG. 6. In order that the indicator serve for all selected tuned devices, three banks of complementary open-seeking switches are illustrated in FIG. 6, one bank for each motor. The built-in "memory" as concerns the positioning system is effected by including in each bank of open-seeking switches a wafer interwired with the corresponding digit control rotary switch associated with each tuned device. In order that only the selected device is instrumental in driving the tuning position, the function selector switch 36 may selectively provide the ground for the open-seeking switches and thus enable only those indicator open-seeking switches associated with the selected function. Conversely, the open-seeking indicator switches associated with the unselective functions, since they are not provided with a ground, are all "open" as concerns the digit wheel positioning system and are ineffective in driving the digit wheels. Thus, FIG. 6 indicates the function selector being in position 1 such that a ground is placed on line 40 to enable only unit 1 open-seeking switcher 50, 51 and 52 to be effective in positioning the associated indicator digit wheels. It is apparent then, that should the operator select function 2, the ground is removed from line 40 by the function selector switch and line 40a would enable only the unit 2 seeking switches. Any miscorrespondence at this instance between the enabled open-seeking switches in the indicator and the associated control switches in the switching unit in FIG. 4 causes the indicator motors to drive for the desired complementary relationship and thus position the indicator wheels to indicate the existing tuned condition of the newly selected function. Function 1 seeking switches 50, 51 and 52 in this instance would remain in a condition corresponding to the last tuned condition.

Previous discussion mentioned briefly that for certain selected controlled devices, all indicator digit wheels may not be utilized and these wheels might be masked or preferably driven to unused or blank positions. Since each digit wheel needs 10 positions to indicate the digits 0 through 9, the 12-position indicator capability may uniquely be used to provide at least one additional unused position (indicating a blank) to which the wheel may be driven.

Figure 7:
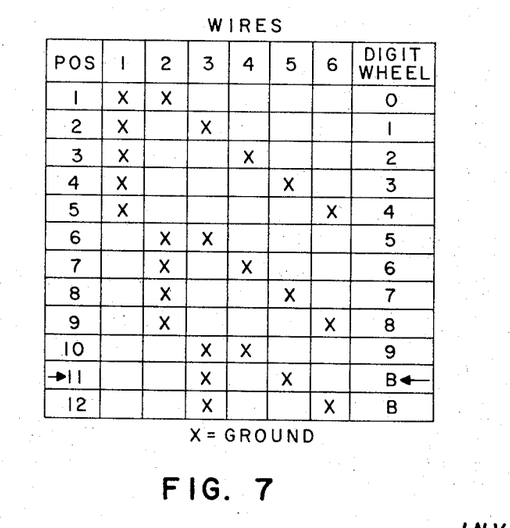
FIG. 7 is a graphical illustration of a type of indicator positioning code employed.
Figure 8:
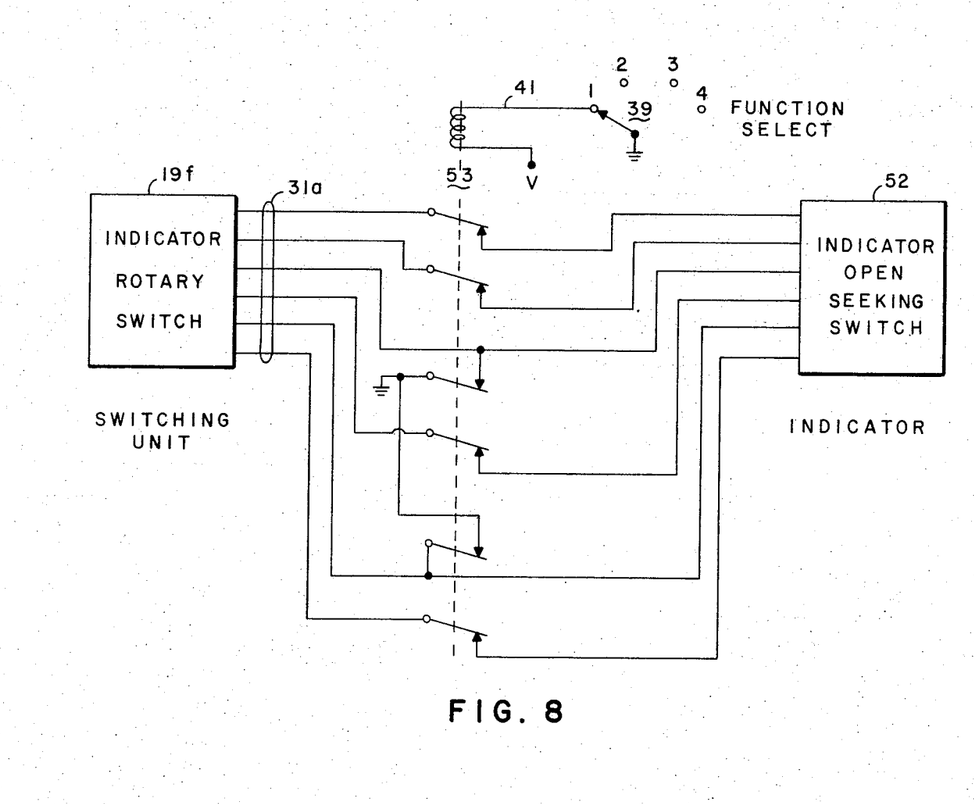
FIG. 8 is a schematic diagram of a logic system effecting blank readout of unused digit wheels.

FIG. 8 illustrates the manner in which a desired wheel may be driven to an eleventh available blank position for a particular function or functions selected. Reference is first made to the 2-out-of-6 tuning code graphically illustrated in the chart of FIG. 7. A 2-out-of-6 grounded-pair tuning code provides 15 distinctly different permutations of pairs of grounded wires, 12 of which are shown Ten permutations present the digits 0 through 9. In order to gain an extra position, a 12-position Geneva system is incorporated since a 10-position system would not provide 11 and the next highest even number becomes 12. Further, a 2-out-of-6 ground pair tuning code is chosen since 2-out-of-5 would permit but 10 positions and not allow for an eleventh to be used as the blank indication. Thus, six wires in a grounded pair scheme provide the extra positioning capability to have at least one blank position on each wheel. The wheel may then be driven to display this blank if it is not used in a particular display. Referring to the table in FIG. 7, the eleventh position is indicated by the grounded permutation of wires 3 and 5. Choosing position 11 as the blank indication to which the wheel will be driven, and assuming that when tuned device number 1 is selected, we will not use the highest order digit wheel, the system must, in response to function 1 being selected, positively provide a ground on control wires 3 and 5 and only 3 and 5. Further, the normal permutation that any other selected function imposes on the control wiring concerning the highest order digit wheel must be preserved. FIG. 8 illustrates a simple switching arrangement by means of which these conditions may be accomplished. With reference to FIG. 8, the control wire 31a from FIG. 4 is indicated as a "bundle" of six wires. Normally, this bundle of wires is carried to the indicator (FIG. 6) as the unit 1 indicator rotary control wires to the complementary open-seeking switch associated with the highest unit indicating wheel 52. Assuming then that the solenoid operated switch 53 of FIG. 8 is in its unenergized position as indicated, it is noted that all interconnections between the indicator rotary switch 19f in FIG. 4 and the open-seeking switch 52 of FIG. 6 are normal and may assume any of the various permutations of grounded pairs called out in the indicator positioning code. However, should the solenoid operated switch 50 be energized (in the embodiment indicated by a ground provision through position one of the function selector switch), lines 1, 2, 4 and 6 are opened while lines 3 and 5 are grounded. Switch 53 then is seen to set up the tuning code corresponding to position 11 of the 2-out-of-6 tuning code chart in FIG. 7. As previously indicated, the eleventh position of each of the 12 possible positions of the indicator wheels would be blank. A similar interconnection in the control wire bundles between the switching unit and the common indicator may be effected for any one of the digit wheels as desired for a particular system.

The single indicator is then seen to selectively indicate the tuned condition of a selected device by incorporating a bank of rotary switches for each of the digit wheels in the display (three such banks being indicated in the embodiment illustrated in FIG. 6). Each of the bank of switches contains a wafer for each of the units which may be selected to be tuned. Thus, it is understood that should six systems be employed in a system, each bank of switches in the indicator as described herein would employ six wafer switches, further, the number of banks of switches is seen to correspond to the number of digit wheels to be incorporated in the display.

The present invention is thus seen to provide a highly versatile remote control tuning system of a plurality of electronic services of controlled devices. A single touch-tune control unit is employed in conjunction with a common indicator and function selector switch, thus permitting the switch control and switch code circuitry to be remotely located. This feature offers a high degree of versatility in the installation and control of a plurality of different electronic functions in an aircraft, for example, where panel spacing is at a premium. Tuning may be advantageously effected by observing the indicator only; thus, permitting the common tuning control unit to be placed out of direct view of the operator.

Although this invention has been described with respect to a particular embodiment thereof, it is not to be so limited, as changes and modifications might be made thereon which fall within the scope of the invention as defined by the appended claims.

I claim:
1. A remote control system comprising a plurality of controlled devices, a common indicating means for presenting an indication of the existing one of a number of identifiable controlled states of a selected one of said controlled devices, a common control unit, selector means, and switching means responsive to said selector means to effect operational interconnection between said common control unit, said common indicating means and said selected one of said controlled devices, said control unit comprising at least one three-position switch, the respective positions of which effect forward, off and reverse control of said controlled devices in response to which the selected one of said controlled devices is controlled bidirectionally in discrete step advances at a predetermined rate for the duration of closing said control unit switches.

2. A system as defined in claim 1 wherein said switching means comprise tuning code generation means for each said controlled unit, each said controlled unit comprising means connected to one of said tuning code generation means and responsive thereto to effect a tuning response, said indicator means comprising means connected to each said code generation means and responsive to actuation to any one thereof to provide an indication identifying the corresponding tuned condition of the associated controlled unit.

3. A system as defined in claim 2 wherein said function selector means comprises means interconnected with said switching means to enable the code generation means associated with the selected one of said controlled units and said indicator, said function selector means further comprises means to prevent observation of predetermined unused portions of said indicator as defined by particular ones of said selected functions.

4. A system as defined in claim 3 further including means responsive to said function selector means to selectively bring a decimal point into observable position between selected ones of a plurality of viewable digits comprising the readout of said indicator means.

5. A system as defined in claim 4 wherein said switching means comprise motor means connected to said control unit switches, said control unit switches effecting selective forward-reverse control of said motor means, said motor means connected through slip clutch means to a plurality of positionable shafts each carrying thereon a notched wheel in cooperative locking engagement with a locking pawl member, predetermined ones of said locking pawls being positioned into unlocked engagement with the associated notched wheel by said function selector means, each said shaft carrying additionally thereon a control switch means comprising a grounded rotor and a plurality of stator contacts which are interconnected with the ungrounded terminal of a powerline and a tuning motor whereby a miscorrespondence between the rotor positions of said associated switches causes said tuning motor to position the associated control switch rotor, and positionable means in said controlled device connected to and positioned in accordance with the rotor position of said controlled switch.

6. A remote control system comprising a plurality of controlled devices each tunable by at least one independently controlled tuning means, a common tuning actuator means comprising a plurality of switching means each adapted for bi-directional control of associated controlled tuning means in a selected one of said controlled devices, tuning switching means including activating means for same connected to each of said cotrolled tuning means for each controlled device, a function selecting means connecting to each of said tuning switching means and including means for enabling those of said tuning switching means associated with a selected one of said controlled devices and including means condition responsive to the enabled ones of said tuning switching means to provide a readout display of the tuned condition of said selected one of said controlled devices.

References Cited
UNITED STATES PATENTS

Re. 26,404　6/1968　Lunnet et al. ________ 318—28X
3,467,901　9/1969　Deming ____________ 318—30X BENJAMIN DOBECK, Primary Examiner U.S. Cl. X.R.

318—280